(12) United States Patent
Wang et al.

(10) Patent No.: US 12,164,372 B2
(45) Date of Patent: Dec. 10, 2024

(54) DATA RETENTION (DR) WARNING SYSTEM

(71) Applicant: Western Digital Technologies, Inc., San Jose, CA (US)

(72) Inventors: Lisha Wang, Fremont, CA (US); Jinyoung Kim, Fremont, CA (US); Andrew Yu-Jen Wang, Saratoga, CA (US); Jinghuan Chen, Irvine, CA (US); Kroum Stoev, Pleasanton, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/822,119

(22) Filed: Aug. 24, 2022

(65) Prior Publication Data
US 2024/0070017 A1 Feb. 29, 2024

(51) Int. Cl.
*G06F 11/10* (2006.01)
*G06F 12/02* (2006.01)
*G06F 16/11* (2019.01)

(52) U.S. Cl.
CPC ...... *G06F 11/1012* (2013.01); *G06F 12/0253* (2013.01); *G06F 12/0269* (2013.01); *G06F 12/0276* (2013.01); *G06F 16/125* (2019.01); *G06F 2212/702* (2013.01); *G06F 2212/7205* (2013.01)

(58) Field of Classification Search
CPC .......... G06F 11/1012; G06F 12/0253; G06F 12/0269; G06F 12/0276; G06F 16/125; G06F 2212/702; G06F 2212/7205

USPC .............. 714/758, 773; 365/185.09, 185.11, 365/185.29
See application file for complete search history.

(56) References Cited

U.S. PATENT DOCUMENTS

| | | | |
|---|---|---|---|
| 8,966,343 B2* | 2/2015 | Syu | G06F 11/1072 365/185.11 |
| 10,210,041 B2* | 2/2019 | Zhang | G06F 3/0647 |
| 10,891,070 B1* | 1/2021 | Akin | G06F 3/0604 |
| 10,949,113 B2* | 3/2021 | Cai | G06F 3/0679 |
| 11,204,705 B2 | 12/2021 | Sun et al. | |
| 11,237,890 B2* | 2/2022 | Verburg | G06F 11/3452 |
| 11,416,389 B2* | 8/2022 | Akin | G06F 12/0246 |
| 2012/0063231 A1* | 3/2012 | Wood | G11C 11/5628 365/185.18 |
| 2012/0203951 A1* | 8/2012 | Wood | G11C 29/42 711/E12.008 |

(Continued)

FOREIGN PATENT DOCUMENTS

CN 108804025 A 11/2018

*Primary Examiner* — John J Tabone, Jr.
(74) *Attorney, Agent, or Firm* — ARENTFOX SCHIFF LLP

(57) ABSTRACT

Aspects of a storage device including a memory and a controller are provided. The controller may determine to perform garbage collection on a superblock. During the garbage collection process, the controller will typically move the superblock into an erase pool for erasing the superblock. However, aspects of the disclosure are directed to a method of measuring a raw bit error rate (RBER) of the superblock prior to erasure. The measured RBER may be used to estimate a data retention time of the storage device and provide the customer with an early warning notification if a health metric of the storage devices reaches a threshold retention time.

14 Claims, 9 Drawing Sheets

(56) References Cited

U.S. PATENT DOCUMENTS

| | | | | |
|---|---|---|---|---|
| 2013/0132652 A1* | 5/2013 | Wood | ............... | G11C 29/42 |
| | | | | 711/103 |
| 2014/0059405 A1* | 2/2014 | Syu | ............... | G11C 16/04 |
| | | | | 711/E12.008 |
| 2014/0108891 A1* | 4/2014 | Strasser | ............ | G11C 16/3404 |
| | | | | 365/185.21 |
| 2015/0193302 A1* | 7/2015 | Hyun | ............... | G11C 29/028 |
| | | | | 714/764 |
| 2016/0110249 A1* | 4/2016 | Orme | ............... | G06F 11/1048 |
| | | | | 714/6.24 |
| 2016/0232088 A1* | 8/2016 | Mohan | ............ | G06F 12/0246 |
| 2017/0132074 A1* | 5/2017 | Zhang | ............ | G06F 11/1068 |
| 2018/0181454 A1* | 6/2018 | Lin | ............... | G06F 11/0793 |
| 2018/0341418 A1* | 11/2018 | Ki | ............... | G06F 3/0619 |
| 2019/0087327 A1* | 3/2019 | Kanno | ............ | G06F 12/0261 |
| 2019/0087328 A1* | 3/2019 | Kanno | ............ | G06F 3/0688 |
| 2020/0394133 A1* | 12/2020 | Carpenter | ............ | G06F 12/0246 |
| 2021/0019074 A1* | 1/2021 | Akin | ............ | G06F 3/0685 |
| 2021/0019255 A1* | 1/2021 | Akin | ............ | G06F 12/0246 |
| 2021/0208810 A1 | 7/2021 | Manohar | | |
| 2022/0392558 A1* | 12/2022 | Malshe | ............ | G11C 16/102 |
| 2023/0035529 A1* | 2/2023 | Ginty | ............ | G06F 3/0679 |
| 2023/0197163 A1* | 6/2023 | McNeil | ............ | G11C 16/28 |
| | | | | 365/189.011 |
| 2023/0214133 A1* | 7/2023 | Muchherla | ......... | G11C 11/5628 |
| | | | | 711/103 |
| 2023/0393920 A1* | 12/2023 | Kwong | ............ | G06F 11/008 |
| 2024/0070017 A1* | 2/2024 | Wang | ............ | G06F 12/0253 |

\* cited by examiner

DATA RETENTION (DR) WARNING SYSTEM

BACKGROUND

Field

This disclosure is generally related to electronic devices and more particularly to storage devices.

Introduction

Digital storage devices enable users to store and retrieve data. Examples of storage devices include non-volatile memory devices. A non-volatile memory generally retains data after a power cycle. An example of a non-volatile memory is a flash memory, which may include array(s) of Not-And (NAND) flash memory cells on one or more dies. Flash memory may be found in solid-state devices (SSDs), Secure Digital (SD) cards, Universal Serial Bus (USB) cards, and the like.

How long data can be safely stored in a NAND flash memory depends heavily on its program and erase cycle, drive usage temperature, retention time, and temperature. Manufacturers of digital storage devices spend millions of dollars annually performing tests to measure and quantify reliability and data integrity of the storage devices. In some examples, the tests are configured to wear the storage devices to end of life (EOL) and evaluate drive endurance margin for data retention. However, the results of these tests can vary across similar devices due to diversity in the cycling conditions that each of the tested drives experienced. For example, power off retention time and retention temperature may vary across the devices tested, and thus, some devices may wear faster. These tests may last for relatively long durations of time, for example three months.

Thus, in order to establish data points that accurately reflect EOL and data retention of storage devices under various conditions, manufacturers may be required to perform a significant number of tests on the storage devices. This may pose a challenge for both the manufacturer and end user due to the tests being expensive and of a long duration. For example, completing such tests under various conditions could take years.

SUMMARY

Certain aspects are directed to a storage device that includes a memory and a controller coupled to the memory. In some examples, the controller is configured to determine to perform garbage collection on a first superblock. In some examples, the controller is configured to copy valid data from the first superblock to a second superblock in response to the determination to perform garbage collection. In some examples, the controller is configured to measure a raw bit error rate (RBER) of the first superblock. In some examples, the controller is configured to estimate a data retention time of the storage device based on the measured RBER.

Certain aspects are directed to a method for self-testing by a storage device. In some examples, the method includes determining to perform garbage collection on a first superblock. In some examples, the method includes copying valid data from the first superblock to a second superblock in response to the determination to perform garbage collection. In some examples, the method includes measuring a raw bit error rate (RBER) of the first superblock. In some examples, the method includes estimating a data retention time of the storage device based on the measured RBER.

Certain aspects are directed to a storage device configured for self-testing. In some examples, the storage device includes means for determining to perform garbage collection on a first superblock. In some examples, the storage device includes means for copying valid data from the first superblock to a second superblock in response to the determination to perform garbage collection. In some examples, the storage device includes means for measuring a raw bit error rate (RBER) of the first superblock. In some examples, the storage device includes means for estimating a data retention time of the storage device based on the measured RBER.

Certain aspects are directed to a non-transitory computer-readable medium having instructions stored thereon that, when executed by a storage device, cause the storage device to perform operations. In some examples, the operations include determining to perform garbage collection on a first superblock. In some examples, the operations include copying valid data from the first superblock to a second superblock in response to the determination to perform garbage collection. In some examples, the operations include measuring a raw bit error rate (RBER) of the first superblock. In some examples, the operations include estimating a data retention time of the storage device based on the measured RBER.

Certain aspects are directed to a server that includes a memory and a controller coupled to the memory. In some examples, the controller is configured to determine that a storage device is powered off. In some examples, the controller is configured to estimate a safe power-off duration based on data extrapolated from a raw bit error rate (RBER) of at least one superblock of the storage device.

Certain aspects are directed to a method for a server to facilitate self-testing at a storage device. In some examples, the method includes determining that a storage device is powered off. In some examples, the method includes estimating a safe power-off duration based on data extrapolated from a raw bit error rate (RBER) of at least one superblock of the storage device.

Certain aspects are directed to a server. In some examples, the server may include means for determine that a storage device is powered off. In some examples, the server may include means for estimating a safe power-off duration based on data extrapolated from a raw bit error rate (RBER) of at least one superblock of the storage device.

Certain aspects are directed to a non-transitory computer-readable medium having instructions stored thereon that, when executed by a server, cause the server to perform operations. In some examples, the operations include determining that a storage device is powered off. In some examples, the operations include estimating a safe power-off duration based on data extrapolated from a raw bit error rate (RBER) of at least one superblock of the storage device.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
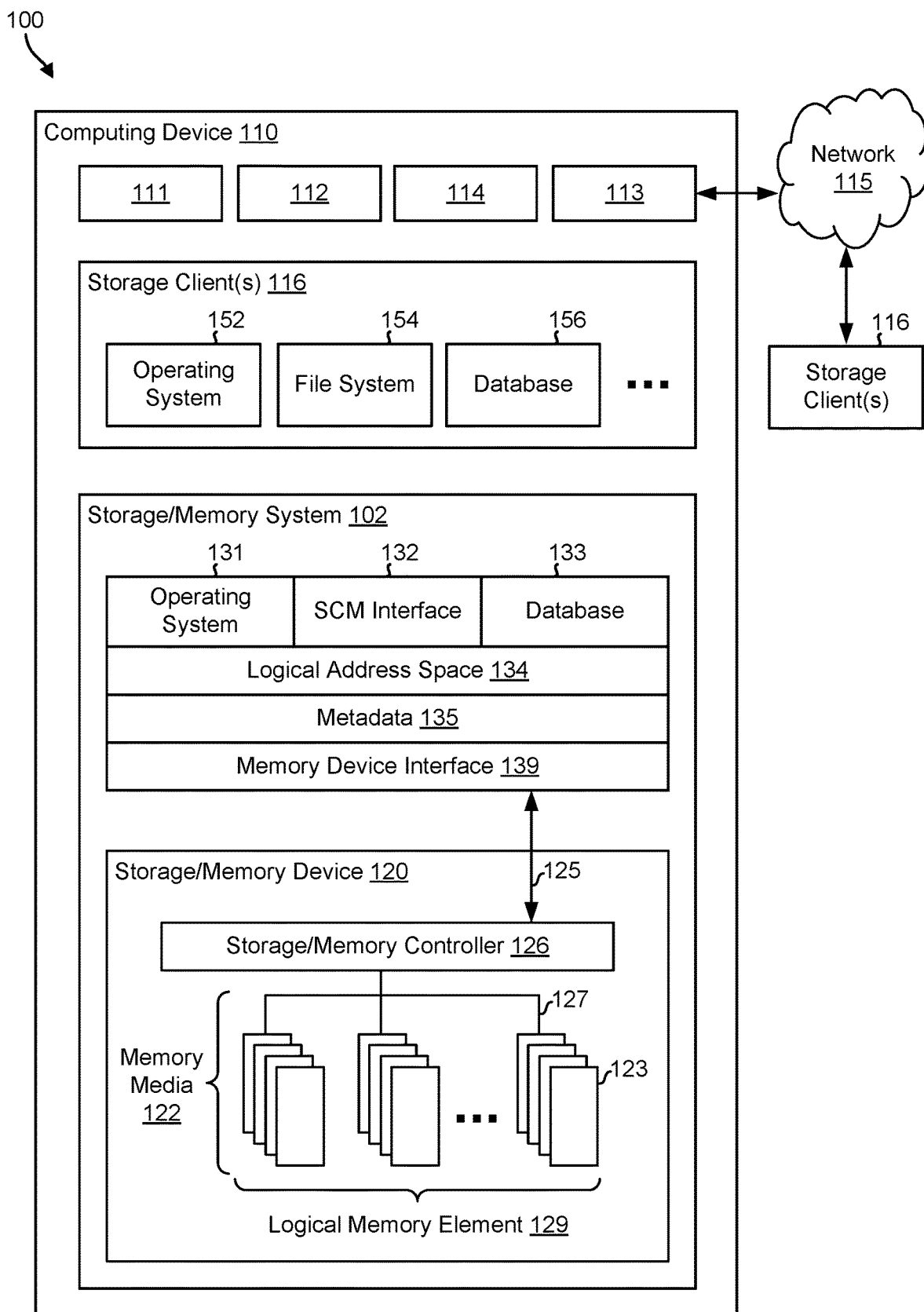
FIG. 1 is a block diagram illustrating an exemplary host/client and file system, as well as a network providing communication with other hosts/clients.

Although manufacturers of digital storage devices have access to tests configured to measure and quantify reliability and data integrity of the storage devices, those tests are expensive and take a relatively long time to complete. For example, running enough tests to establish data points that accurately reflect end of life (EOL) and data retention of storage devices under various conditions could take years.

Accordingly, aspects of the disclosure are directed to techniques and methods of self-testing that can be performed on a storage device while in use. For example, a storage device may be configured to internally perform raw block error rate (RBER) measurements on memory blocks within the storage device. In certain aspects, the storage device may include a solid-state device (SSD) array that contains multiple superblocks. Each superblock may be defined as a grouping of one or more flash memory cells that a controller associates with a unique superblock address; the constituent flash memory cells in a superblock may be physically contiguous. For example, an SSD may include a capacity of approximately 512 giga-bytes (GB s) and a superblock may store approximately 16 mega-bytes (MBs) of data.

The storage device may include a storage controller that is configured to perform internal storage operations such as garbage collection. In some examples, the controller may audit superblocks to determine whether any of the superblocks contain a threshold amount of invalid data. If a particular superblock satisfies the threshold condition for invalid data, the controller may determine to perform garbage collection on that superblock. In some examples, the valid data may be copied from the particular superblock and written to another superblock. The particular superblock may then be added to a pool of superblocks to be erased.

However, in certain aspects, the controller may perform an RBER measurement on the particular superblock prior to its erasure. For example, the controller may measure an RBER of the superblock and extrapolate the measurement, along with others, to estimate a time at which data retention of the drive may become a high risk for failure and/or data error. The extrapolated data may be stored and provided to the customer in order to provide the customer with an indication of when data on the drive should be backed up. Thus, even in the event of drive power off, the customer may be informed of critical times to ensure their data is backed up. In addition, the cost and time of running tests by the manufacturer may be reduced or eliminated.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host will be presented. These aspects are well suited for flash storage devices, such as SSDs, USB and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

FIG. 1 is a schematic block diagram illustrating an embodiment of a system 100 and computing device 110 for digital storage and data retention self-test warning system. In some embodiments, a storage/memory device 120 can at least partially operate on and/or in communication with a nonvolatile and/or volatile storage/memory system 102 of a computing device 110, which can include a processor 111, volatile memory 112, a communication interface 113, and a non-transitory, computer readable storage medium 114. The processor 111 can include one or more central processing units, one or more general-purpose processors, one or more application-specific processors, one or more virtual processors (e.g., the computing device 110 can be a virtual machine operating within a host), one or more processor cores, or the like. The communication interface 113 can include one or more network interfaces configured to communicatively couple the computing device 110 and/or memory controller 126 to a communication network 115, such as an Internet protocol (IP) network, a storage area network (SAN), wireless network, wired network, or the like. The computer readable storage medium 114 can include executable instructions configured to cause the computing device 110 (e.g., processor 111) to perform steps of one or more of the methods disclosed herein.

The storage/memory device 120, in various embodiments, can be disposed in one or more different locations relative to the computing device 110. In one embodiment, the memory device 120 includes one or more non-volatile and/or volatile memory elements 123, such as semiconductor chips or packages or other integrated circuit devices disposed on one or more printed circuit boards, storage housings, and/or other mechanical and/or electrical support structures. For example, the memory device 120 can include one or more direct inline memory module (DIMM) cards, one or more expansion cards and/or daughter cards, a memory card, a universal serial bus (USB) drive, a solid-state-drive (SSD) or other hard drive device, and/or can have another memory and/or storage form factor. The memory device 120 can be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The memory device 120, in one embodiment, can be disposed on a memory bus of a processor 111 (e.g., on the same memory bus as the volatile memory 112, on a different memory bus from the volatile memory 112, in place of the volatile memory 112, or the like). In a further embodiment, the memory device 120 can be disposed on a peripheral bus of the computing device 110, such as a peripheral component interconnect express (PCI Express or PCIe) bus, a SATA bus, a PATA bus, an SCSI bus, a FireWire bus, a fiber channel connection, a USB, a PCIe or PCIe-AS bus, or the like. In another embodiment, the memory device 120 can be disposed on a data network 115, such as an Ethernet network, an InfiniB and network, SCSI RDMA over a network 115, a SAN, a LAN, a WAN such as the Internet, another wired and/or wireless network 115, or the like.

According to various embodiments, a memory controller 126 can manage one or more memory devices 120 and/or memory elements 123. The memory device(s) 120 can include recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a memory device 120). Memory units and/or regions can include, but are not limited to: pages, memory divisions, blocks, sectors, collections or sets of physical storage locations (e.g., logical pages, logical blocks), or the like.

A device driver and/or the memory controller 126, in certain embodiments, can present a logical address space 134 to the storage clients 116. As used herein, a logical address space 134 refers to a logical representation of memory resources. The logical address space 134 can include a plurality (e.g., range) of logical addresses. As used herein, a logical address refers to any identifier for referencing a memory resource (e.g., data), including, but not limited to a logical block address (LBA), cylinder/head/sector (CHS) address, a file name, an object identifier, an index node (inode), a universally unique identifier (UUID), a globally unique identifier (GUID), a hash code, a signature, an index entry, a range, an extent, or the like.

A device driver for the memory device 120 can maintain metadata 135, such as a logical to physical address mapping structure to map logical addresses of the logical address space 134 to media storage locations on the memory device(s) 120. A device driver can be configured to provide storage services to one or more storage clients 116. The storage clients 116 can include local storage clients 116 operating on the computing device 110 and/or remote storage clients 116 accessible via the network 115 and/or network interface 113. The storage clients 116 can include, but are not limited to: operating systems 152, file systems 154, database applications 156, server applications, kernel-level processes, user-level processes, applications, and the like.

A device driver can be communicatively coupled to one or more memory devices 120. The one or more memory devices 120 can include different types of memory devices including, but not limited to: solid-state storage devices, semiconductor storage devices, SAN storage resources, volatile memory devices, non-volatile memory devices, or the like. The one or more memory devices 120 can include one or more respective memory controllers 126 and memory media 122. A device driver can provide access to the one or more memory devices 120 via a traditional block I/O interface 131. Additionally, a device driver can provide access to enhanced functionality through the storage class memory (SCM) interface 132. The metadata 135 can be used to manage and/or track data operations performed through any of the Block I/O interface 131, SCM interface 132, cache interface 133, or other related interfaces.

The cache interface 133 can expose cache-specific features accessible via a device driver for the memory device 120. Also, in some embodiments, the SCM interface 132 presented to the storage clients 116 provides access to data transformations implemented by the one or more memory devices 120 and/or the one or more memory controllers 126.

A device driver can present a logical address space 134 to the storage clients 116 through one or more interfaces. As discussed above, the logical address space 134 can include a plurality of logical addresses, each corresponding to respective media locations on one or more memory devices 120. A device driver can maintain metadata 135 comprising any-to-any mappings between logical addresses and media locations, or the like.

A device driver can further include and/or be in communication with a memory device interface 139 configured to transfer data, commands, and/or queries to the one or more memory devices 120 over a bus 125, which can include, but is not limited to: a memory bus of a processor 111, a peripheral component interconnect express (PCI express or PCIe) bus, a SATA bus, a parallel ATA bus, a SCSI, FireWire, fiber channel, a USB, a PCIe or PCIe-AS bus, a network 115, Infiniband, SCSI RDMA, or the like. The memory device interface 139 can communicate with the one or more memory devices 120 using IO-CTL command(s), IO-CTL command extension(s), remote direct memory access, or the like.

The communication interface 113 can include one or more network interfaces configured to communicatively couple the computing device 110 and/or the memory controller 126 to a network 115 and/or to one or more remote, network-accessible storage clients 116. The storage clients 116 can include local storage clients 116 operating on the computing device 110 and/or remote storage clients 116 accessible via the network 115 and/or the network interface 113. The memory controller 126 is part of and/or in communication with one or more memory devices 120. Although FIG. 1 depicts a single memory device 120, the disclosure is not limited in this regard and could be adapted to incorporate any number of memory devices 120, a combination of one or more volatile memory devices 120 and one or more non-volatile memory devices 120, or the like.

The memory device 120 can include one or more elements 123 of memory media 122. In one embodiment, an element 123 of memory media 122 includes a volatile memory medium 122, such as random-access memory (RAM), dynamic RAM (DRAM), synchronous DRAM (SDRAM), double data rate (DDR) SDRAM, static RAM (SRAM), thyristor RAM (T-RAM), zero-capacitor RAM (Z-RAM), or the like. In certain embodiments, an element 123 of memory media 122 includes a non-volatile memory medium 122, such as ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS) memory, programmable metallization cell (PMC) memory, conductive-bridging RAM (CBRAM), magneto-resistive RAM (MRAM), magnetic storage media (e.g., hard disk, tape), optical storage media, or the like. Thus, the memory device 120 may rely, for example, on stored voltage levels or stored resistance levels. The one or more elements 123 of memory media 122, in certain embodiments, include SCM.

While legacy technologies such as NAND flash can be block and/or page addressable, storage class memory, in one embodiment, is byte addressable. In further embodiments, storage class memory can be faster and/or have a longer life (e.g., endurance) than NAND flash; can have a lower cost, use less power, and/or have a higher storage density than DRAM; or offer one or more other benefits or improvements when compared to other technologies. For example, storage class memory can include one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 can more generally include one or more non-volatile recording media capable of recording data, which can be referred to as a non-volatile memory medium, a non-volatile storage medium, or the like. Further, the nonvolatile memory device 120, in various embodiments, can include a non-volatile recording device, a non-volatile memory device, a non-volatile storage device, or the like. Similarly, a nonvolatile memory element 123, in various embodiments, can include a non-volatile recording element, a non-volatile memory element, a non-volatile storage element, or the like.

The non-volatile memory media 122 can include one or more non-volatile memory elements 123, which can include, but are not limited to: chips, packages, planes, die, or the like. A non-volatile memory controller 126 can be configured to manage data operations on the nonvolatile memory media 122, and can include one or more processors, programmable processors (e.g., FPGAs), ASICs, micro-controllers, or the like. In some embodiments, the nonvolatile memory controller 126 is configured to store data on and/or read data from the nonvolatile memory media 122, to transfer data to/from the non-volatile memory device 120, and so on.

The non-volatile memory controller 126 can be communicatively coupled to the non-volatile memory media 122 by way of a bus 127. The bus 127 can include an I/O bus for communicating data to/from the non-volatile memory elements 123. The bus 127 can further include a control bus for communicating addressing, and other command and control information to the non-volatile memory elements 123. In some embodiments, the bus 127 can communicatively couple the non-volatile memory elements 123 to the non-volatile memory controller 126 in parallel. This parallel access can allow the non-volatile memory elements 123 to be managed as a group, forming a logical memory element 129. The logical memory element can be partitioned into respective logical memory units (e.g., logical pages) and/or logical memory divisions (e.g., logical blocks). The logical memory units can be formed by logically combining physical memory units of each of the non-volatile memory elements.

The non-volatile memory controller 126 can include and/or be in communication with a device driver executing on the computing device 110. A device driver can provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver can provide SCM interface 132, which can provide other storage services to the storage clients 116. In some embodiments, the SCM interface 132 can include extensions to the block device interface 131 (e.g., storage clients 116 can access the SCM interface 132 through extensions or additions to the block device interface 131). Alternatively, or in addition, the SCM interface 132 can be provided as a separate API, service, and/or library. A device driver can be further configured to provide a cache interface 133 for caching data using the non-volatile memory system 102. A device driver can further include a non-volatile memory device interface 139 that is configured to transfer data, commands, and/or queries to the non-volatile memory controller 126 over a bus 125, as described above.

Figure 2:
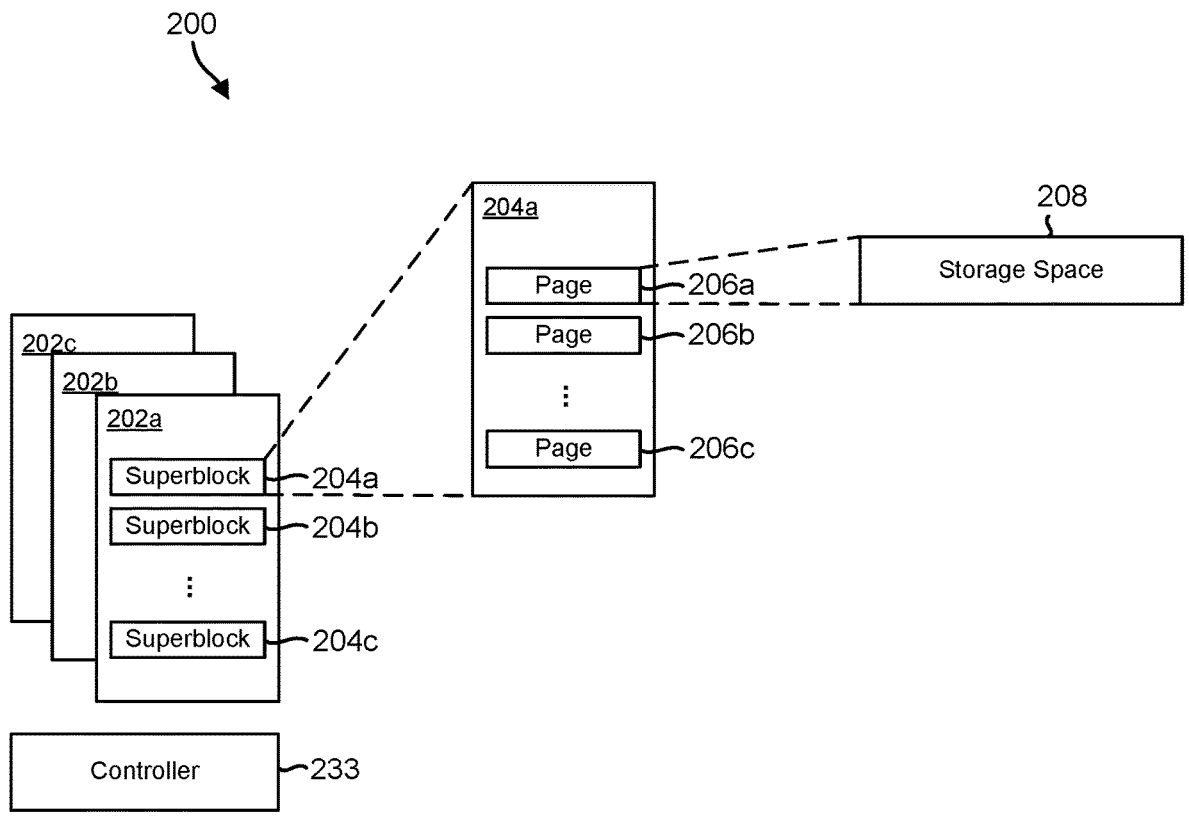
FIG. 2 is a block diagram conceptually illustrating an example hierarchical organization of an solid state drive (SSD) memory device.

FIG. 2 is a block diagram conceptually illustrating an example hierarchical organization of an SSD memory device 200. Each SSD memory media (e.g., a first SSD media 202a, a second SSD media 202b, and a third SSD media 202c—collectively referred to as SSD media 202) includes one or more superblocks (e.g., a first superblock 204a, a second superblock 204b, and a third superblock 204c—collectively referred to as superblock(s) 204). Each of which in turn comprises one or more pages (e.g., a first page 206a, a second page 206b, and a third page 206c—collectively referred to as page(s) 206). In some embodiments, the SSD device 200 has a capacity of approximately 512 GB, a superblock stores approximately 16 MB of data, and a page stores approximately 8 KB of data.

Each superblock is a grouping of one or more flash memory cells (e.g., flash blocks) that a controller 233 associates with a unique superblock address; the constituent flash blocks in a superblock 204 are typically physically contiguous. In some examples, the controller permits erasures (or "flashes") to occur only at the superblock-level, and does not permit erasures at the level of a superblock's constituent individual physical flash blocks. The pages 206 of a superblock may be defined by a physically contiguous grouping of one or more flash pages that the controller 233 associates with a unique combination of a superblock address and page addresses. Each page is a physically contiguous collection of memory cells in the solid-state memory that the controller associates with a unique combination of a superblock address and a page address.

Generally speaking, within a particular superblock 204, the controller 233 may implement only sequential write operations. In other words, the controller 233 may spread a first write operation to a first superblock 204a along the first set of contiguous pages 206 and begin a next, second write operation to the same first superblock 204a at the next contiguous page.

Each page 206 includes storage space 208 defined by a collection of memory cells (e.g., 8 KB) within the page used to store user data, metadata, or raw data (e.g., data structures utilized by the SSD module as described in greater detail herein).

Examples of Digital Storage Device Self-DR Testing

Figure 3:
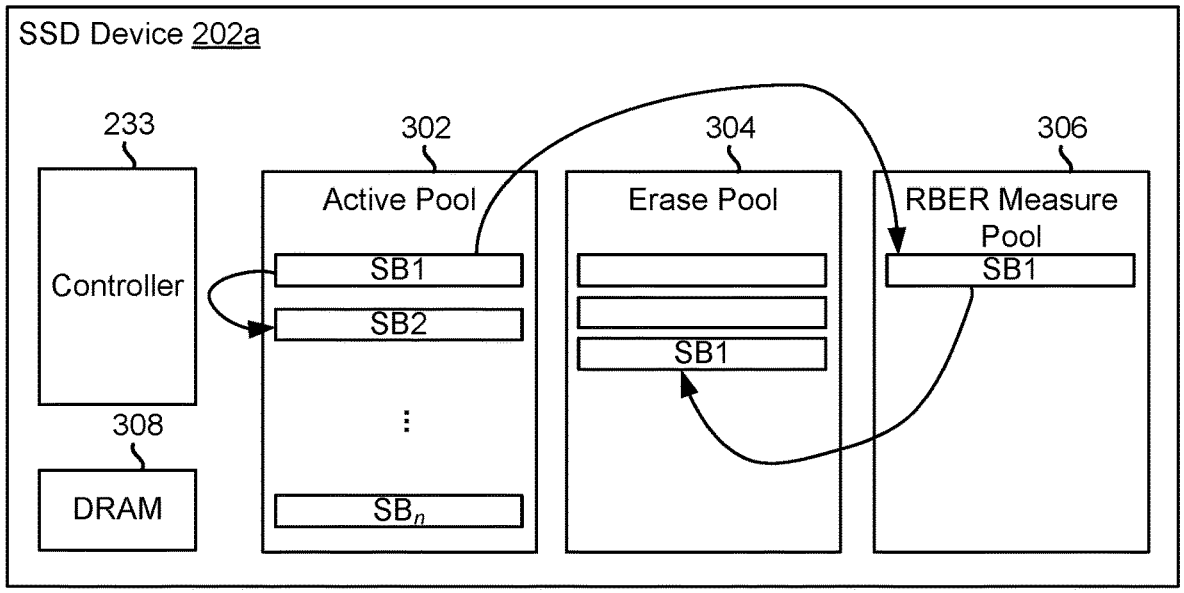
FIG. 3 is a block diagram illustrating example SSD device similar to the device of FIG. 2.

FIG. 3 is a block diagram illustrating example SSD device 200 from FIG. 2 discussed above. The SSD device 200 includes a controller 233 and a plurality of superblocks (e.g., SB1, SB2, . . . , SB$_n$). The controller 233 may perform functions such as garbage collection and data retention (DR) testing on the plurality of superblocks.

Initially, the controller 233 may determine whether data stored on any of the superblocks in an active pool 302 of superblocks is subject to garbage collection. The active pool 302 is a pool of superblocks that are currently active (e.g., can be used to satisfy input/output commands). The threshold condition may be satisfied when the controller 233 determines that SB1 contains less than or equal to a certain amount of valid data. For example, if the threshold is 8 MB of data, and the superblock contains 8 MB or less of valid data, the threshold condition may be satisfied.

In the example illustrated, the controller 233 determined that the data on SB1 has satisfied a threshold condition. Upon satisfaction of the threshold condition, the controller 233 may first copy the valid data from SB1 and write the copied data to new blocks of an active superblock (e.g., SB2). The controller 233 may then move SB1 from the active pool 302 to an RBER measurement pool 306. Note that SB 1 still contains both the valid and invalid data.

The controller 233 may measure an RBER of superblocks in the RBER measurement pool 306. Any suitable method of performing an RBER measurement may be performed on SB1, but in some examples, the controller 233 may provide current to SB1 and read back the resulting voltage at page-level. The RBER may be the measure of bit errors found at the page-level.

It should be noted that a typical write command may be performed by writing data to a superblock in a sequential order, starting at a lower wordline (WL) and progressively writing up to an upper WL. Accordingly, the oldest data stored on a superblock will always be at the lower WL, while relatively newer data at the upper WL. Thus, in some examples, the RBER measurement may be performed on the lower WL in order to measure data that may be most prone to error. In another example, the RBER measurement may also (or alternatively) be performed on the weakest WL of the superblock being tested. In some examples, the RBER measurement may be performed on the lower WL, the weakest WL, and/or one or more randomly selected WLs. It should be noted that a weak wordline may be a wordline of a superblock having a substantially lower retention time than other wordlines of the same superblock. In some examples, the weak wordline may be indicated by the controller (e.g., the controller may store an address of one or more weak wordlines).

Figure 4:
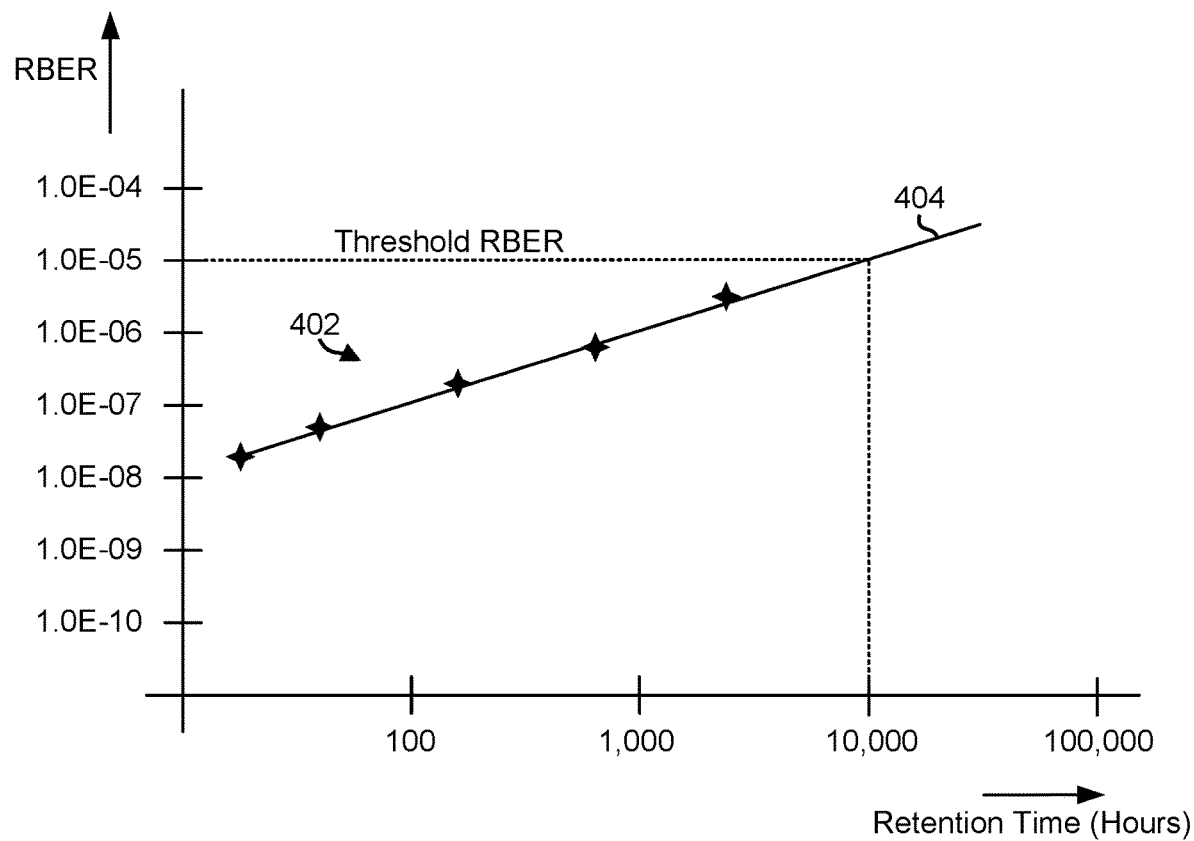
FIG. 4 is a line graph illustrating an example slope that the controller may use to estimate a time for backing up data stored on an SSD device.

In some examples, the controller 233 may schedule an RBER measurement and store the result in a DRAM 308. The controller 233 may use the RBER measurement to determine a coefficient (e.g., a slope). For example, the controller 233 may extrapolate a data point based on a temperature of the SSD device 200 and a duration of time that the SSD device 200 has been operating at the time of the RBER measurement. For example, FIG. 4 is a line graph illustrating an example slope 404 that the controller 233 may use to estimate a time for backing up data stored on an SSD device 200. Here, the RBER measurements 402 may be spread out across time. Once more than one RBER measurement has been taken, the controller 233 may estimate the slope 404 and determine a future time (e.g., in hours of operation) that the SSD device 200 will meet a threshold RBER (e.g., 1e-5, when there are too many bit errors occurring in the SSD device 200). The controller 233 may update the slope estimation with each successive RBER measurement.

The example of FIG. 4 may be for a particular temperature (e.g., 40 deg. C.) of the SSD device, or for a range of temperatures (e.g., 30 deg. C.-50 deg. C.) of the device. The SMART log may include information that is indexed by temperature or temperature ranges.

Turning back to FIG. 3, once the RBER of SB1 has been measured, the controller 233 may move SB1 to an erase pool 304, to have SB1 erased according to a normal garbage collection operation. SB1 may be returned to the active pool 302 after completion of the garbage collection function.

Figure 5:
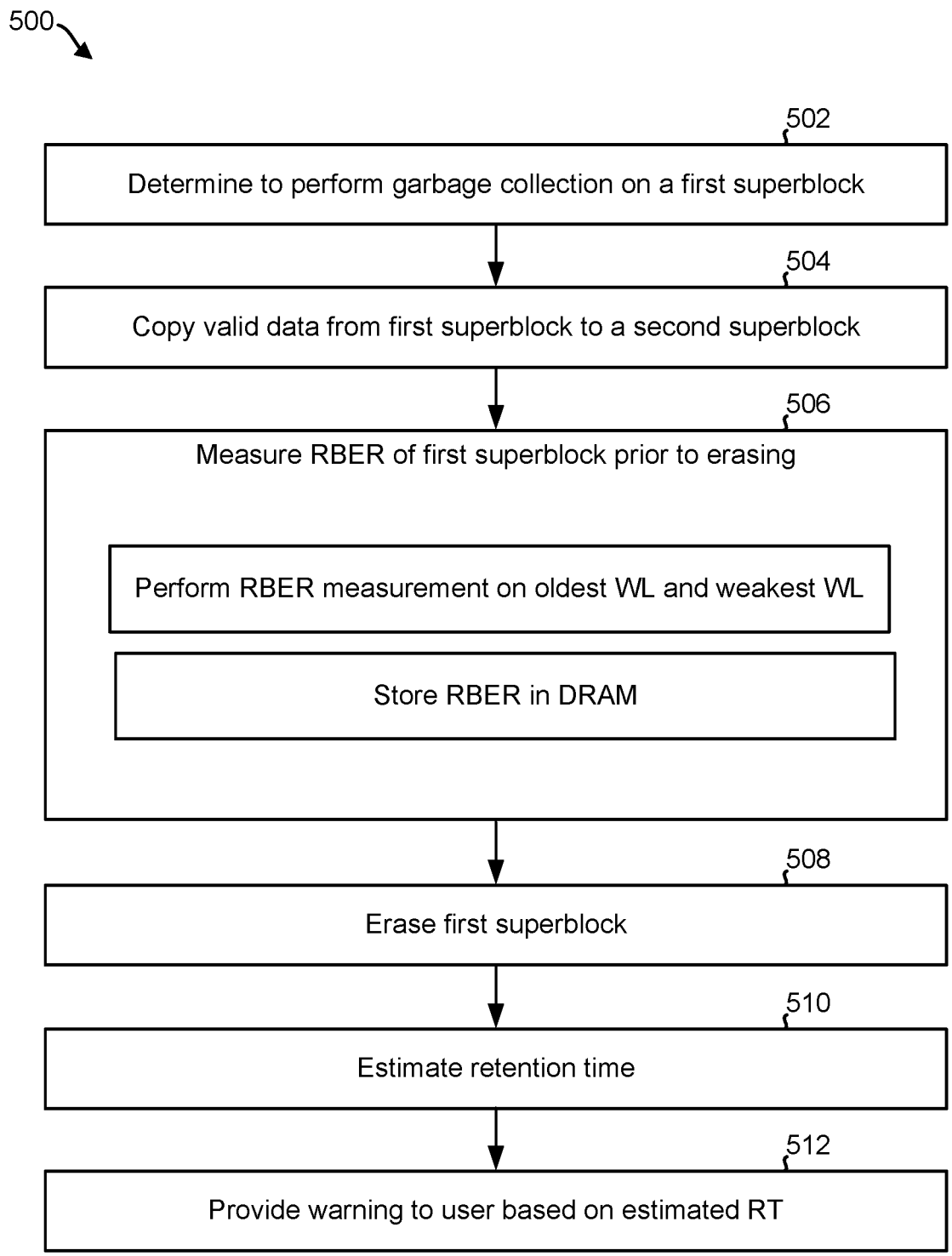
FIG. 5 is a flow diagram illustrating an example method for self-data retention (DR) testing by an SSD device.

FIG. 5 is a flow diagram illustrating an example method 500 for self-DR testing by an SSD device (e.g., SSD device 200 of FIGS. 2 and 3). The SSD device may perform the following functionality during its use by a customer. The following method describes an example process for collection of RBER measurement (e.g., RBER measurement 402 of FIG. 4).

At a first step 502, a controller of the SSD device may determine to perform garbage collection on a first superblock of the SSD device. As discussed, if the first superblock meets a threshold condition wherein it contains equal to or greater than an amount of invalid data, the controller may determine to perform garbage collection on the first superblock. The controller may determine to perform garbage collection on the first superblock for other reasons as well. For example, the controller may audit WLs of various superblocks to check for errors during operation of the SSD device. If a particular superblock has more than or equal to a threshold error count, the controller may determine to perform garbage collection on that superblock. In some examples, the controller may schedule periodic RBER measurements. If there is no superblock in the RBER measurement pool, the controller may select a superblock for RBER measurement and/or garbage collection based on which superblock has a lowest health metric, a highest program erase cycle (PEC) count, and/or most errors detected during WL auditing. Accordingly, in some cases, the controller may select a superblock for RBER measurement even if the superblock has a high amount of valid data (e.g., does not meet a threshold of invalid data).

At a second step 504, the controller may copy valid data from the first superblock to a second superblock. The second superblock may be an active superblock (e.g., in an active pool of memory). For example, the second superblock may be a superblock that was recently erased in a garbage collection process (e.g., a superblock from the erase pool).

At a third step 506, the controller may measure the RBER of the first superblock prior to erasing the first superblock. That is, the RBER measurement may be based on data that is currently stored in the superblock. As noted, in some examples, the controller may perform the RBER measurement on one or more of an oldest WL and/or a weakest WL. The controller may then store the measured RBER in a memory (e.g., DRAM).

At a fourth step 508, the controller may put the first superblock into an erase pool for the garbage collection function. The garbage collection function may erase the first superblock and put the first superblock back into the active pool.

At a fifth step 510, the controller may use the RBER measurement of the first superblock to estimate a slope (e.g., using at least one other RBER measurement) to estimate a retention time. See, for example, FIG. 4. For example, the SSD device may be configured with a threshold RBER that indicates the most bit errors that the SSD device may tolerate before backing up data stored on the SSD device. Although the SSD device may continue to retain data and perform read/write commands after the threshold RBER, the threshold may indicate a recommended time that, once reached, may prompt backing up the data stored on the SSD device.

At a sixth step 512, the controller may store or write the estimated retention information in to a self-monitoring, analysis, and reporting technology (SMART) log. In some cases, a customer is notified of an estimated time when the SSD device may reach the threshold RBER. In other cases, a customer may learn of the estimated time by pulling data stored in the SMART log for analysis. Notification may be provided to the customer using any suitable notification service.

Figure 6:
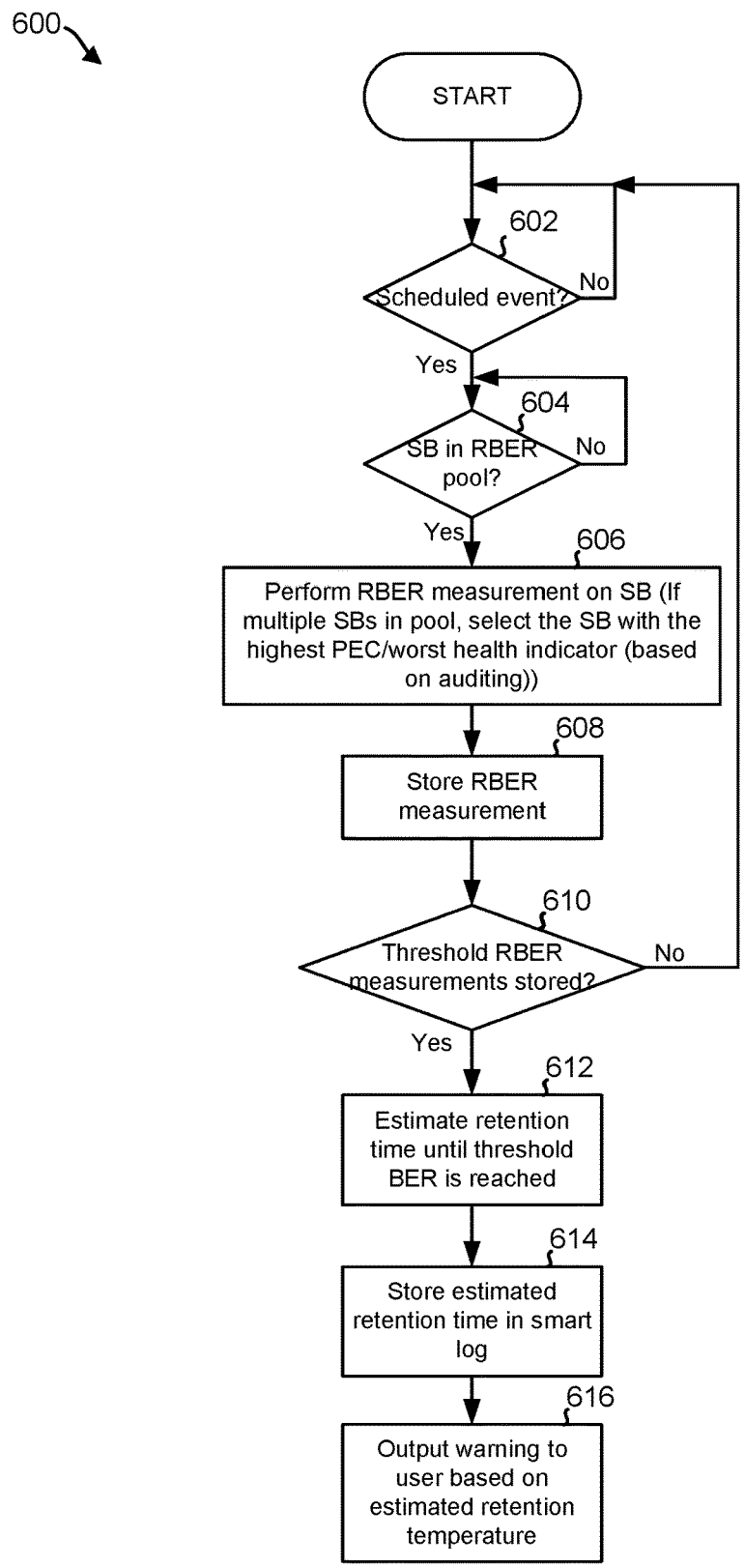
FIG. 6 is a flow chart illustrating an example process for self-DR testing by an SSD device.

FIG. 6 is a flow chart illustrating an example process 600 for self-DR testing by an SSD device (e.g., SSD device 200 of FIGS. 2 and 3).

In a first step 602, a controller of the SSD device may determine whether there is a scheduled event. The scheduled event may be a scheduled time for measuring RBER of a superblock. The controller may be configured to measure an RBER of a superblock according to scheduled events. If there is no scheduled event, the controller may not perform any self-DR testing. If there is a scheduled event, the controller may perform a second step 604.

It should be noted that there may not be any periodic and/or scheduled events. Instead, one or more events may trigger the controller to perform self-DR testing. For example, the scheduled event may be triggered by a superblock that has a high PEC and/or worst health that is being recycled (e.g., being subjected to a garbage collection function). In some examples, the controller may track the superblock if an audit reveals that the superblock has a high PEC. Once that superblock is put into a garbage collection queue, the controller may first perform an RBER measurement of the superblock prior to garbage collection (e.g., the controller may move the superblock into the RBER pool instead of the erase pool).

At the second step 604, the controller may determine whether there is a superblock in the RBER pool. In some examples, upon occurrence of a scheduled event, the controller may wait until a superblock with a high PEC and/or worst health is moved into the RBER pool. For example, there may be other superblocks in the RBER pool, but the controller may be configured to only measure superblocks that meet a threshold PEC or health metric. In such an example, other superblocks may be kept in RBER pool for a defined time window. At expiration of time window, the superblocks can be moved to erase pool to be erased, or RBER of the superblocks measured and then moved to erase pool.

If there is no superblock in the erase pool, the controller may wait until a superblock meeting the PEC and/or health metric criteria enters the erase pool, or until any superblock enters the erase pool. In other examples, the controller may select a superblock that is not yet ready for garbage collection and is outside of the erase pool. If there is a superblock in the erase pool, the controller may perform a third step 606.

At the third step 606, the controller may perform RBER measurement on a superblock in the erase pool, or on a superblock that was selected based on highest PEC and/or worst health among the superblocks.

At a fourth step 608, the controller may store the RBER measurement in a DRAM or other suitable storage location. If the RBER measurement is the first RBER measurement, the controller may wait until another scheduled event before it estimates a DR time. For example, at a fifth step 610, the controller may determine whether a threshold number of RBER measurements are stored. For example, the threshold may be 2 or more. If the threshold number of RBER measurements are stored, the controller may perform a sixth step 612 wherein the controller estimates a DR time where a threshold RBER is reached. That is, the controller may estimate a slope (e.g., see FIG. 4) and determine at what time the threshold RBER is reached.

At a seventh step 614, the controller may store the estimated retention information (e.g., data indicative of a retention time) in a SMART log.

At an eighth step 616, the controller may use a notification service to notify the customer of the estimated data retention time. It should be noted that while FIG. 6 does not explicitly describe the superblock data being copied to a new block, and the superblock being moved to the RBER pool prior to being erased, FIG. 5 illustrates and describes steps that can be performed concurrently those illustrated here.

Figure 7:
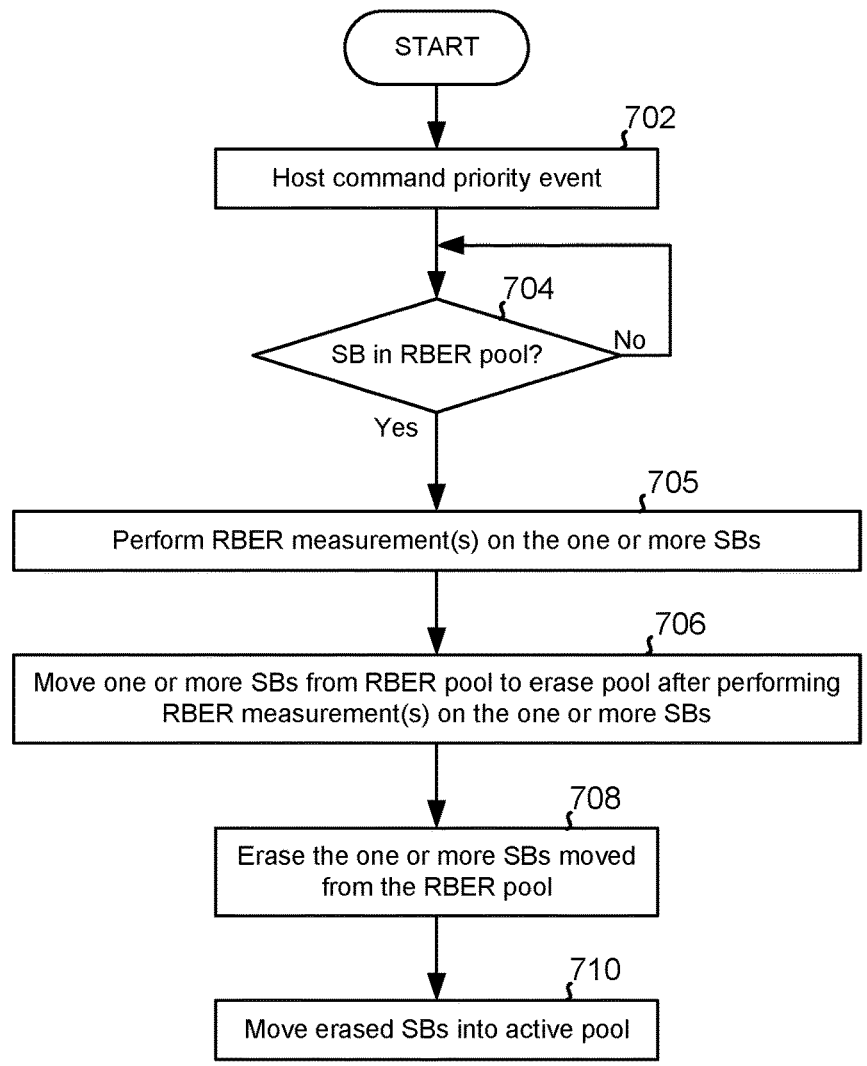
FIG. 7 is a flow chart illustrating an example process for self-DR testing by an SSD device.

FIG. 7 is a flow chart illustrating an example process 700 for self-DR testing by an SSD device (e.g., SSD device 200 of FIGS. 2 and 3). In some examples, a superblock may be moved out of an RBER pool based on input/output (IO) demands and limited free space (e.g., due to large amount of data stored on device or to lost use of superblocks due to excessive recycling and/or garbage collection).

For example, at a first step 702, a controller may determine that it has received a command from the host that takes priority over an RBER measurement. For example, the controller may receive a write/read command that requires the resources of the superblock and has priority over the RBER measurement.

At a second step 704, the controller may determine if the superblock is in a RBER pool pending RBER measurement. If yes, the controller may perform a third step 705 by performing an RBER measurement on the one or more superblocks. The controller may perform a fourth step 706 by moving the superblock from the RBER pool to the erase pool after an RBER measurement made on the superblock. While in the erase pool, the controller may perform a fifth step 708 by erasing the superblock and moving (at a sixth step 710) the erased superblock to the active pool.

Accordingly, by providing in-situ DR testing using RBER measurement, an estimated DR timeline can be established by the SSD device during device usage.

However, in some examples, the SSD device may be powered off. While the device is powered off, it is not aware of the duration of time that the device is powered off or the device temperatures during the time it is powered off. Thus, in order to improve an estimated time that the SSD device will reach a retention time threshold, information about the SSD device may be collected while the device is off.

In some examples, a server (e.g., storage client(s) 116 of FIG. 1) may query the SMART log data (e.g., drive health data including DR margin) periodically. The server may update the log to include information such as a duration(s) for which the SSD device was powered off. In some examples, the SSD device may include a battery-free temperature sensor and battery free clock that can be used to wirelessly transmit temperature and time data periodically using radio frequency identification (RFID) technology. The server may periodically audit the smart log health data and also query battery free temp sensor and clock. The server can compare the smart log to the temp and time that the SSD device has been off to notify the users if there is a potential for loss on the device.

Figure 8:
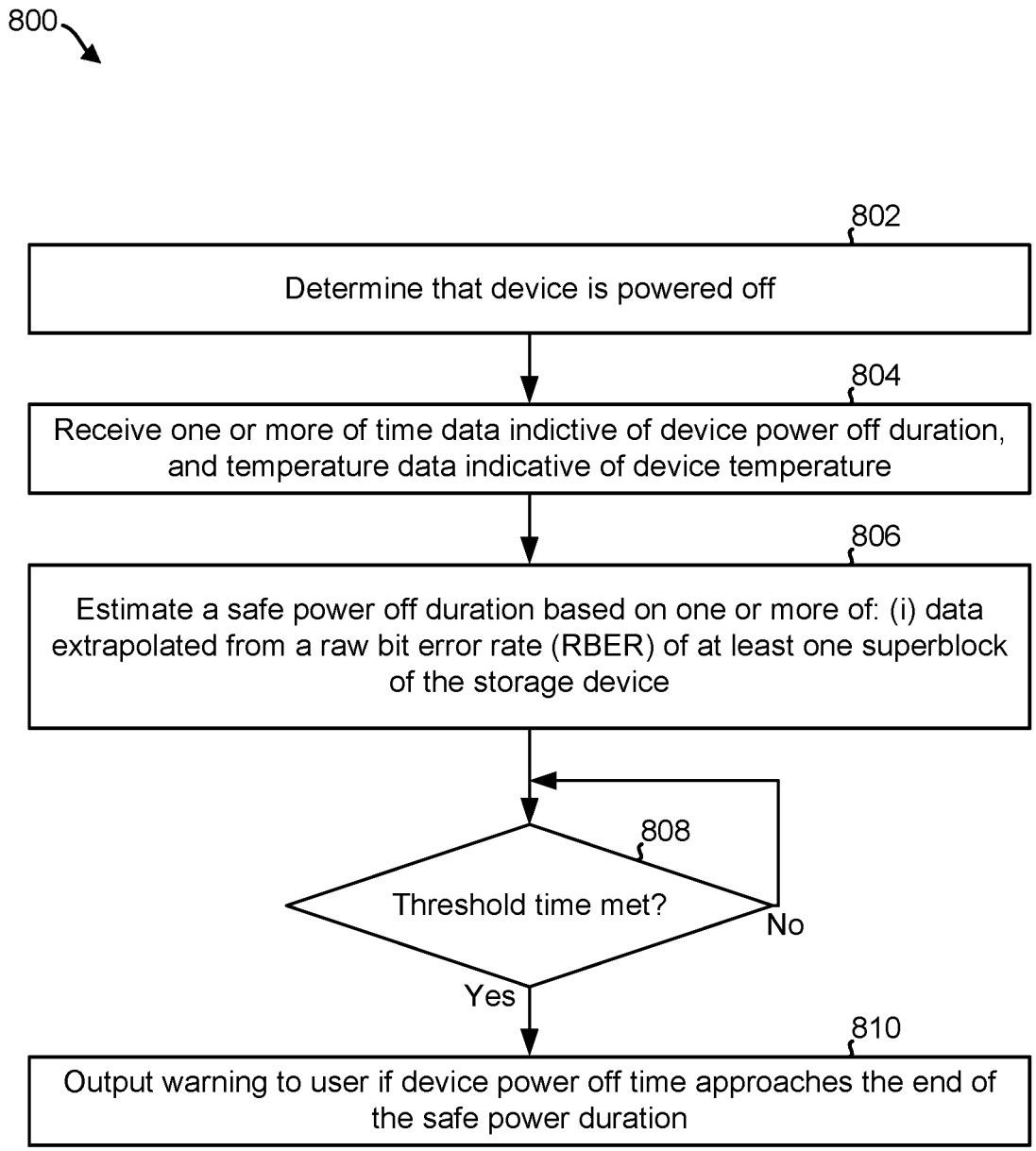
FIG. 8 is a flow diagram illustrating an example method 800 for DR testing of an SSD device.

FIG. 8 is a flow diagram illustrating an example method 800 for DR testing of an SSD device (e.g., SSD device 200 of FIGS. 2 and 3) that is powered off. The following method may be used concurrently with one or more steps of the methods and examples described above. In some examples, the method may be performed by a server in physical proximity to the SSD device.

At a first step 802, the server may determine that the SSD device is powered off. In some examples, the SSD device may notify the server of its intent to power off, and in some examples, the SSD device may provide a duration of the power off. In other examples, the SSD device may periodically query the SSD device to determine whether the device is on or off.

At a second step 804, the server may receive one or more of time data indicative of device power off duration, and temperature data indicative of device temperature. That is, in some examples, the server may periodically query the temperature sensor and/or clock to determine whether the device is still off, and what temperature the device is. The query may be in the form of an RFID transmission and a backscatter response.

At a third step 806, the server may estimate a safe power off duration based on one or more of: (i) maximum power off time based on data contained in the SMART log, and (ii) estimated a data retention time for the device based on extrapolated SMART log data. For example, the server may incorporate time data into the SMART log indicating a duration of time that the device has been powered off and use the additional time to extrapolate a time when the device will reach a threshold RBER.

In some examples, the server may perform a temperature read of the SSD device (e.g., by RFID query) and incorporate temperature information into the SMART log. For example, server may incorporate temperature data into the SMART log indicating one or more temperatures of the device during the time that the device has been powered off. That is, the server may estimate a retention time based on data extrapolated from multiple RBER measurements, time data received from the battery-less clock, and/or the device temperature received from the battery-less temperature sensor. The server may use that information to extrapolate a time when the device will reach a threshold RBER while it is powered off.

At a fourth step 808, the server may determine whether a threshold time has been met. For example, the threshold time may be a time that occurs prior to the estimated power-off retention time. Thus, prior to the estimated retention time, the server may be triggered to send a notification to the customer informing them that the powered off device is approaching the estimated retention time limit (e.g., when a safe power off duration is no longer safe for data retention on the SSD device).

At a fifth step 810, the server may output a warning to the customer if a device power off time approaches an end of a safe power off duration. For example, the server may determine, based on SMART log data, a safe power off duration for the SSD device. If the SSD device is powered off and the duration of time that it is powered off approaches the limit of the safe power off duration, the server may provide a notification to the customer indicating that they customer should resume power the SSD device.

Figure 9:
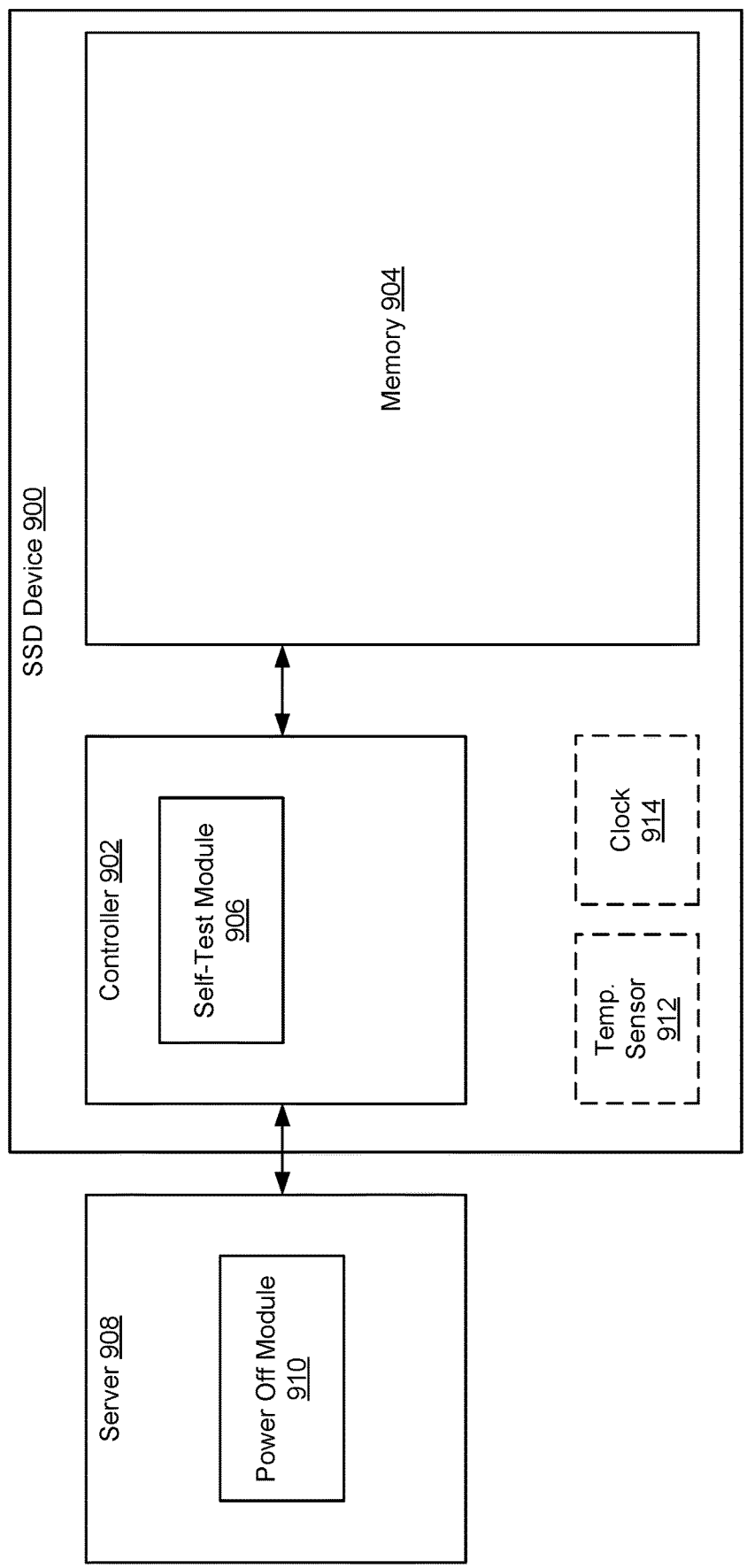
FIG. 9 is a conceptual diagram illustrating an example of a controller that configured to perform self DR testing of a memory.

FIG. 9 is a conceptual diagram illustrating an example of a controller 902 that configured to perform self DR testing of a memory 904. As illustrated in FIG. 9, the controller 902 is coupled to the memory 904 (e.g., NAND) in a storage device 900. For example, controller 902 may correspond to controller 126/233 of FIGS. 1-3 and memory 904 may correspond to the memory media 122/202 of SSD memory devices 120/200 of FIGS. 1 and 2. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

The storage device 900 may optionally include a temperature sensor 912 and a clock 914. In some examples, the temperature sensor 912 and the clock 914 may be RFID devices that operate without a battery, or with a low power source. For example, the server 908 may transmit a signal or waveform to one or both of the temperature sensor 912 and clock 914 and receive in response a backscattered signal with data indicative of a temperature of the storage device 900 and a current time.

The self-test module 906 may provide means for performing the aforementioned processes described in FIGS. 5-7.

For example, the self-test module 906 may provide a means for determining to perform garbage collection on a first superblock. For example, the controller may determine to perform garbage collection on a superblock if the superblock meets a threshold condition wherein it contains less valid data than other data. The self-test module 906 may provide means for copying valid data from the first superblock to a second superblock in response to the determination to perform garbage collection; means for measuring a raw bit error rate (RBER) of the first superblock; means for estimating a data retention time of the storage device based on the measured RBER; means for measuring the RBER from one or more of an oldest wordline of the first superblock or a weakest wordline of the first superblock; means for erasing the first superblock after measuring the RBER; means for outputting a warning notification to a user of the storage device if the estimated data retention time is equal to a current time; means for selecting the first superblock based on at least one of: (i) a schedule event, or (ii) a determination that the first superblock contains a threshold amount of valid data; and means for storing the estimated data retention time in a self-monitoring, analysis, and reporting technology (SMART) log, as shown in FIG. 5.

In certain aspects, the measured RBER is a first measured RBER, and wherein the data retention time is estimated based on the first measured RBER and a second measured RBER measured from a second superblock prior to the first measured RBER.

In certain aspects, the controller is further configured to measure the RBER from one or more of an oldest wordline of the first superblock or a weakest wordline of the first superblock.

In certain aspects, the controller is further configured to erase the first superblock after measuring the RBER.

In certain aspects, the estimated data retention time is further based on a threshold RBER indicative of a configured maximum bit error rate.

FIG. 9 also includes a server 908 coupled to the storage device. The coupling may be a wireless interface (e.g., network interface) and/or a direct wire connection. The server may correspond to storage client(s) 116 of FIG. 1. The server 908 may be implemented in software, hardware, or a combination of hardware and software. In one exemplary embodiment, the server is implemented with several software modules executed on one or more processors, but as those skilled in the art will appreciate, the server 908 may be implemented in different ways. The skilled artisan will readily understand how best to implement the server 908 based on the particular design parameters of the system.

The server 908 includes a power off module 910 configured to provide means for performing the aforementioned processes described in FIG. 8.

For example, the power off module 910 may provide a means for determining that a storage device is powered off; means for estimating a safe power-off duration based on data extrapolated from a raw bit error rate (RBER) of at least one superblock of the storage device; means for outputting a warning notification to a user of the storage device based on a threshold time and the estimated safe power-off duration, wherein the threshold time occurs prior an end of the estimated safe power-off duration; means for transmitting signaling to at least one of a temperature sensor of the storage device or a clock associated with the storage device; and means for receiving a backscattered signal from the at least one of the temperature sensor or the clock, wherein the backscattered signal comprises data indicative of at least one of a temperature of the storage device or time data associated with the storage device, as shown in FIG. 5.

In certain aspects, the safe power-off duration estimate is further based on at least one of the temperature of the storage device or the time data associated with the storage device.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a memory comprising a first superblock and a second superblock; and
a controller coupled to the memory and configured to:
select the first superblock for an audit, wherein the first superblock is selected from an active pool of superblocks if no superblocks are held in an inactive pool of superblocks, and wherein the first superblock is selected from the active pool of superblocks based on the first superblock having a lowest health metric relative to other superblocks from the active pool;
audit the first superblock to determine whether an amount of invalid data contained in the first superblock satisfies a threshold condition;
determine to perform garbage collection on the first superblock based on satisfaction of the threshold condition; and
in response to the determination to perform garbage collection and prior to erasure of invalid data from the first superblock:
copy valid data from the first superblock to the second superblock if the first superblock is selected from the active pool of superblocks; and
measure a first raw bit error rate (RBER) of the first superblock; and
estimate a data retention time of the storage device based on the first RBER and a second RBER measured from the second superblock prior to the first superblock measurement.

2. The storage device of claim 1, wherein the controller is further configured to measure the first RBER from one or more of an oldest wordline of the first superblock or a weakest wordline of the first superblock.

3. The storage device of claim 1, wherein the controller is further configured to erase the first superblock after measuring the first RBER of the first superblock.

4. The storage device of claim 1, wherein the estimated data retention time is further based on a threshold RBER indicative of a configured maximum bit error rate.

5. The storage device of claim 4, wherein the controller is further configured to output a warning notification to a user of the storage device if the estimated data retention time is equal to a current time.

6. The storage device of claim 1, wherein the controller, being configured to audit the first superblock, is further configured to select the first superblock for audit based on a scheduled event.

7. The storage device of claim 1, wherein the controller is further configured to store the estimated data retention time in a self-monitoring, analysis, and reporting technology (SMART) log.

8. A method for self-testing by a storage device, the method comprising:
selecting a first superblock for an audit, wherein the first superblock is selected from an active pool of superblocks if no superblocks are held in an inactive pool of superblocks, and wherein the first superblock is selected from the active pool of superblocks based on the first superblock having a lowest health metric relative to other superblocks from the active pool;
auditing the first superblock of the storage device to determine whether an amount of invalid data contained in the first superblock satisfies a threshold condition;
determining to perform garbage collection on the first superblock based on satisfaction of the threshold condition; and in response to the determination to perform garbage collection and prior to erasure of invalid data from the first superblock:

copying valid data from the first superblock to a second superblock of the storage device if the first superblock is selected from the active pool of superblocks; and measuring a first raw bit error rate (RBER) of the first superblock; and estimating a data retention time of the storage device based on the first RBER and a second RBER measured from the second superblock prior to the first superblock measurement.

9. The method of claim 8, further comprising measuring the first RBER from one or more of an oldest wordline of the first superblock or a weakest wordline of the first superblock.

10. The method of claim 8, further comprising erasing the first superblock after measuring the first RBER of the first superblock.

11. The method of claim 10, wherein the estimated data retention time is further based on a threshold RBER indicative of a configured maximum bit error rate.

12. The method of claim 8, further comprising outputting a warning notification to a user of the storage device if the estimated data retention time is equal to a current time.

13. The method of claim 8, further comprising selecting the first superblock for audit based on a scheduled event.

14. The method of claim 8, further comprising storing the estimated data retention time in a self-monitoring, analysis, and reporting technology (SMART) log.

* * * * *